US010195642B2

(12) United States Patent
Grunlan et al.

(10) Patent No.: US 10,195,642 B2
(45) Date of Patent: *Feb. 5, 2019

(54) INNER LINER BARRIER FROM MULTILAYER THIN FILM

(71) Applicants: Compagnie Generale Des Etablissments Michelin, Clermont-Ferrand (FR); The Texas A&M University System, College Station, TX (US)

(72) Inventors: Jaime C. Grunlan, College Station, TX (US); Morgan A. Priolo, College Station, TX (US); Brian R. Bergman, Simpsonville, SC (US); John J. McHugh, Greenville, SC (US)

(73) Assignees: Compagnie Generale des Etablissements Michelin (FR); The Texas A&M University System, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/369,947

(22) PCT Filed: Dec. 28, 2012

(86) PCT No.: PCT/US2012/071903
§ 371 (c)(1),
(2) Date: Jun. 30, 2014

(87) PCT Pub. No.: WO2013/101975
PCT Pub. Date: Jul. 4, 2013

(65) Prior Publication Data
US 2014/0363689 A1 Dec. 11, 2014

Related U.S. Application Data

(60) Provisional application No. 61/581,743, filed on Dec. 30, 2011.

(51) Int. Cl.
*B05D 1/36* (2006.01)
*C08K 3/34* (2006.01)
(Continued)

(52) U.S. Cl.
CPC ............... *B05D 1/36* (2013.01); *B05D 1/02* (2013.01); *B05D 5/00* (2013.01); *B05D 7/02* (2013.01);
(Continued)

(58) Field of Classification Search
None
See application file for complete search history.

(56) References Cited

U.S. PATENT DOCUMENTS 3,674,078 A 7/1972 Sasaki
6,232,389 B1 * 5/2001 Feeney ............... B60C 1/00
427/245
(Continued)

FOREIGN PATENT DOCUMENTS

JP 2004-130831 4/2004
JP 2004-160831 A 4/2004
(Continued)

OTHER PUBLICATIONS

English Translation and Notification of Second Office Action for Chinese Application No. 201280068535.1 dated May 12, 2016.
(Continued)

*Primary Examiner* — Michael P. Rodriguez
(74) *Attorney, Agent, or Firm* — Tumey L.L.P.

(57) ABSTRACT

A tire has a coating with a quadlayer or multiple quadlayers, and a method produces the same. In an embodiment, the method for coating a rubber substrate includes exposing the rubber substrate to a first cationic solution to produce a first cationic layer on the rubber substrate. The method also includes exposing the first cationic layer to a first anionic
(Continued)

solution to produce a first anionic layer on the first cationic layer. In addition, the method includes exposing the first anionic layer to a second cationic solution to produce a second cationic layer on the first anionic layer. The method further includes exposing the second cationic layer to a second anionic solution to produce a second anionic layer on the second cationic layer. A quadlayer includes the first cationic layer, the first anionic layer, the second cationic layer, and the second anionic layer. The coating includes the quadlayer.

17 Claims, 4 Drawing Sheets

(51) Int. Cl.
| | | |
|---|---|---|
| B60C 1/00 | (2006.01) | |
| B05D 1/02 | (2006.01) | |
| B05D 5/00 | (2006.01) | |
| B05D 7/00 | (2006.01) | |
| B05D 7/02 | (2006.01) | |
| C08L 33/02 | (2006.01) | |
| C08L 71/02 | (2006.01) | |
| C08L 79/02 | (2006.01) | |
| B32B 27/30 | (2006.01) | |
| B32B 9/00 | (2006.01) | |
| B32B 25/00 | (2006.01) | |
| B32B 25/08 | (2006.01) | |
| B32B 27/06 | (2006.01) | |
| B32B 27/08 | (2006.01) | |
| B32B 27/28 | (2006.01) | |
| B32B 27/34 | (2006.01) | |
| C08K 3/20 | (2006.01) | |
| C08K 3/04 | (2006.01) | |

(52) U.S. Cl.
CPC ......... *B05D 7/5483* (2013.01); *B05D 7/5883* (2013.01); *B32B 9/00* (2013.01); *B32B 25/00* (2013.01); *B32B 25/08* (2013.01); *B32B 27/06* (2013.01); *B32B 27/08* (2013.01); *B32B 27/28* (2013.01); *B32B 27/288* (2013.01); *B32B 27/30* (2013.01); *B32B 27/302* (2013.01); *B32B 27/306* (2013.01); *B32B 27/308* (2013.01); *B32B 27/34* (2013.01); *B60C 1/0008* (2013.01); *B60C 1/0041* (2013.01); *C08K 3/346* (2013.01); *C08L 33/02* (2013.01); *C08L 71/02* (2013.01); *C08L 79/02* (2013.01); B32B 2255/00 (2013.01); B32B 2255/10 (2013.01); B32B 2255/28 (2013.01); B32B 2264/00 (2013.01); B32B 2264/02 (2013.01); B32B 2264/102 (2013.01); B32B 2264/108 (2013.01); B32B 2264/12 (2013.01); B32B 2307/308 (2013.01); B32B 2307/7242 (2013.01); B32B 2307/7244 (2013.01); B32B 2605/00 (2013.01); B32B 2605/08 (2013.01); C08K 3/041 (2017.05); C08K 3/042 (2017.05); C08K 3/20 (2013.01); C08K 2201/011 (2013.01); C08L 2203/16 (2013.01); C08L 2205/03 (2013.01); Y10T 428/31826 (2015.04)

(56) References Cited

U.S. PATENT DOCUMENTS

| | | | | |
|---|---|---|---|---|
| 2004/0053037 | A1* | 3/2004 | Koch | B05D 7/56 428/323 |
| 2005/0152955 | A1* | 7/2005 | Akhave | A61L 15/46 424/445 |
| 2007/0213446 | A1 | 9/2007 | Feeney et al. | |
| 2008/0243113 | A1* | 10/2008 | Shastri | A61L 27/047 606/33 |
| 2010/0227070 | A1* | 9/2010 | Grunlan | C09D 5/18 427/352 |
| 2011/0200825 | A1* | 8/2011 | Chakraborty | B05D 3/101 428/412 |
| 2012/0185997 | A1 | 7/2012 | Kirk, II | |
| 2012/0295031 | A1* | 11/2012 | Grunlan | C09D 7/1216 427/407.2 |
| 2013/0165538 | A1* | 6/2013 | Ehrenberg | C08J 5/2243 521/27 |
| 2014/0363579 | A1* | 12/2014 | Grunlan | C08K 3/346 427/412.1 |
| 2014/0363689 | A1 | 12/2014 | Grunlan | |
| 2015/0165478 | A1* | 6/2015 | Grunlan | B05D 5/00 427/407.1 |
| 2015/0328927 | A1* | 11/2015 | Grunlan | B60C 1/00 428/448 |
| 2016/0114294 | A1* | 4/2016 | Grunlan | B01D 53/228 427/470 |

FOREIGN PATENT DOCUMENTS

| | | |
|---|---|---|
| JP | 2015-509043 | 3/2015 |
| JP | 5960283 | 8/2016 |
| JP | 6110876 | 4/2017 |
| WO | 2011023587 | 3/2011 |
| WO | 2013101975 | 7/2013 |
| WO | 2013101976 | 7/2013 |

OTHER PUBLICATIONS

Office Action Chinese State IP Office Application No. 201280068535.1 dated Aug. 27, 2015.
Office Action Japanese Patent Office Application No. 2014-550480 dated Jul. 27, 2015.
Office Action Japanese Patent Office Application No. 2014-550481 dated Aug. 27, 2015.
Official Action for Chinese Application 201280068500.8 dated Feb. 28, 2015.
EP Search Report for Application No. EP12861351.0 dated May 4, 2015.
EP Search Report for Application No. EP12861574.7 dated Apr. 30, 2015.
International Search Report and Written Opinion for PCT/US12/071903 dated Mar. 13, 2013.
International Search Report and Written Opinion for PCT/US12/071905 dated Mar. 13, 2013.
English Translation of Pertinent Part of Japanese Office Action for Japanese Patent Application No. 2014-550480 dated May 17, 2016.
USPTO Office Action for U.S. Appl. No. 14/369,957 dated Jan. 17, 2017.
English Translation and Notification of Rejection Decision for Chinese Application No. 201280068535.1 dated Sep. 8, 2016.
USPTO Office Action for U.S. Appl. No. 14/369,957 dated Aug. 9, 2016.
USPTO Final Office Action for U.S. Appl. No. 14/369,957 dated Aug. 24, 2017.
First JP Office Action and translation for Application No. 2016-123416 dated Aug. 14, 2017.
Decision of Grant for JP Application No. 2017-045664 dated Dec. 19, 2017.
USPTO Final Office Action for U.S. Appl. No. 14/369,957 dated Dec. 4, 2017.
European Examination report for Application No. 12861574.7-1308 dated Dec. 21, 2017.

* cited by examiner

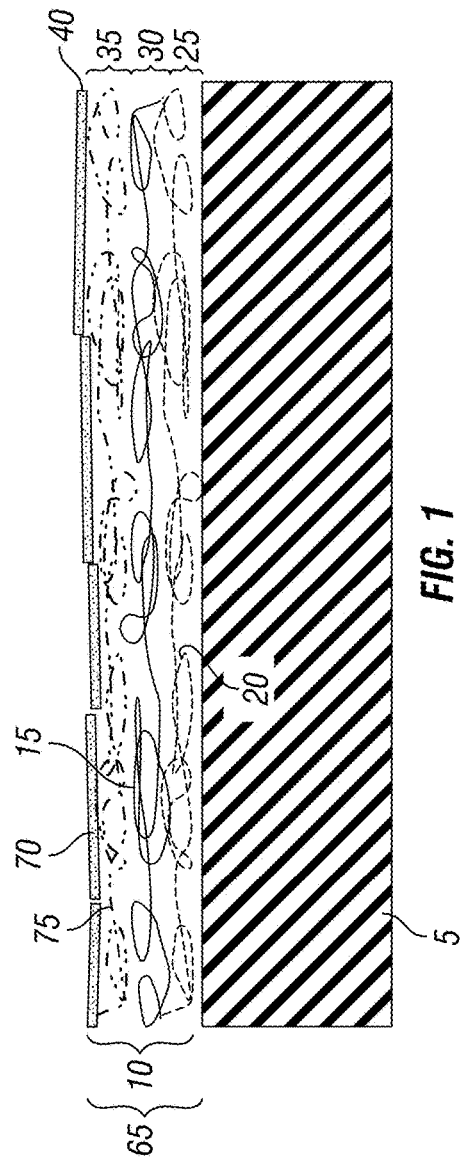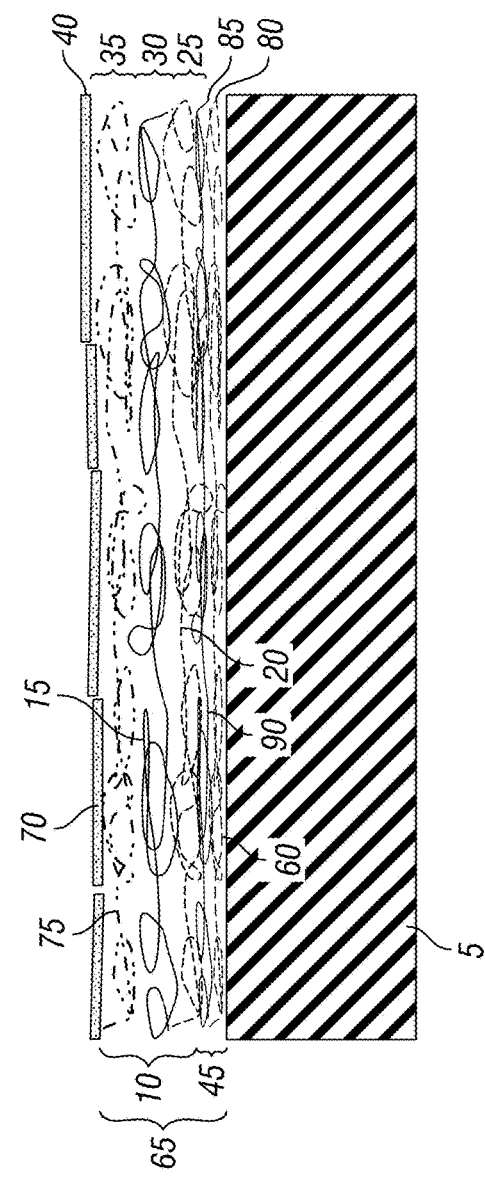

INNER LINER BARRIER FROM MULTILAYER THIN FILM

BACKGROUND OF THE INVENTION

Field of the Invention

This invention relates to the field of gas barriers and more specifically to the field of gas barriers for tires.

Background of the Invention

Thin layers with barriers to gas and vapors are key components in a variety of applications, such as tires. For instance, there is an increased need for improved barrier performance of tires. Conventional tires are typically composed of rubber and include an inner liner. Drawbacks to conventional tires include permeability of the inner liner. Such permeability may allow oxygen to migrate through the tire carcass to the steel belts, which may facilitate oxidation of the steel belts. Further drawbacks include inefficient air retention. For instance, conventional tires may lose air pressure over a period of time and with use, which may increase rolling resistance of the tire.

Consequently, there is a need for improved tires. There are also further needs for increased air retention by tires.

BRIEF SUMMARY OF SOME OF THE PREFERRED EMBODIMENTS

These and other needs in the art are addressed in one embodiment by a method for coating a rubber substrate. The method includes exposing the rubber substrate to a first cationic solution to produce a first cationic layer on the rubber substrate. The method also includes exposing the first cationic layer to a first anionic solution to produce a first anionic layer on the first cationic layer. In addition, the method includes exposing the first anionic layer to a second cationic solution to produce a second cationic layer on the first anionic layer. The method further includes exposing the second cationic layer to a second anionic solution to produce a second anionic layer on the second cationic layer. A quadlayer includes the first cationic layer, the first anionic layer, the second cationic layer, and the second anionic layer. The coating includes the quadlayer.

These and other needs in the art are addressed in another embodiment by a tire that has a rubber substrate with a quadlayer. The quadlayer has a first cationic layer. The quadlayer also has a first anionic layer with the first cationic layer disposed between the rubber substrate and the first anionic layer. In addition, the quadlayer has a second cationic layer with the first anionic layer disposed between the first cationic layer and the second cationic layer. Moreover, the quadlayer has a second anionic layer with the second cationic layer disposed between the first anionic layer and the second anionic layer.

In addition, these and other needs in the art are addressed by a method for coating a rubber substrate. The method includes exposing the rubber substrate to an anionic solution to produce a first anionic layer on the rubber substrate. The method also includes exposing the first anionic layer to a first cationic solution to produce a first cationic layer on the first anionic layer. The method further includes exposing the first cationic layer to a second anionic solution to produce a second anionic layer on the first cationic layer. In addition, the method includes exposing the second anionic layer to a second cationic solution to produce a second cationic layer on the second anionic layer. A quadlayer includes the first anionic layer, the first cationic layer, the second anionic layer, and the second cationic layer. The coating includes the quadlayer.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 1 illustrates an embodiment of a quadlayer on a rubber substrate;

FIG. 2 illustrates an embodiment of a quadlayer, a rubber substrate, and a primer layer;

DETAILED DESCRIPTION OF THE PREFERRED EMBODIMENTS

Figure 3:
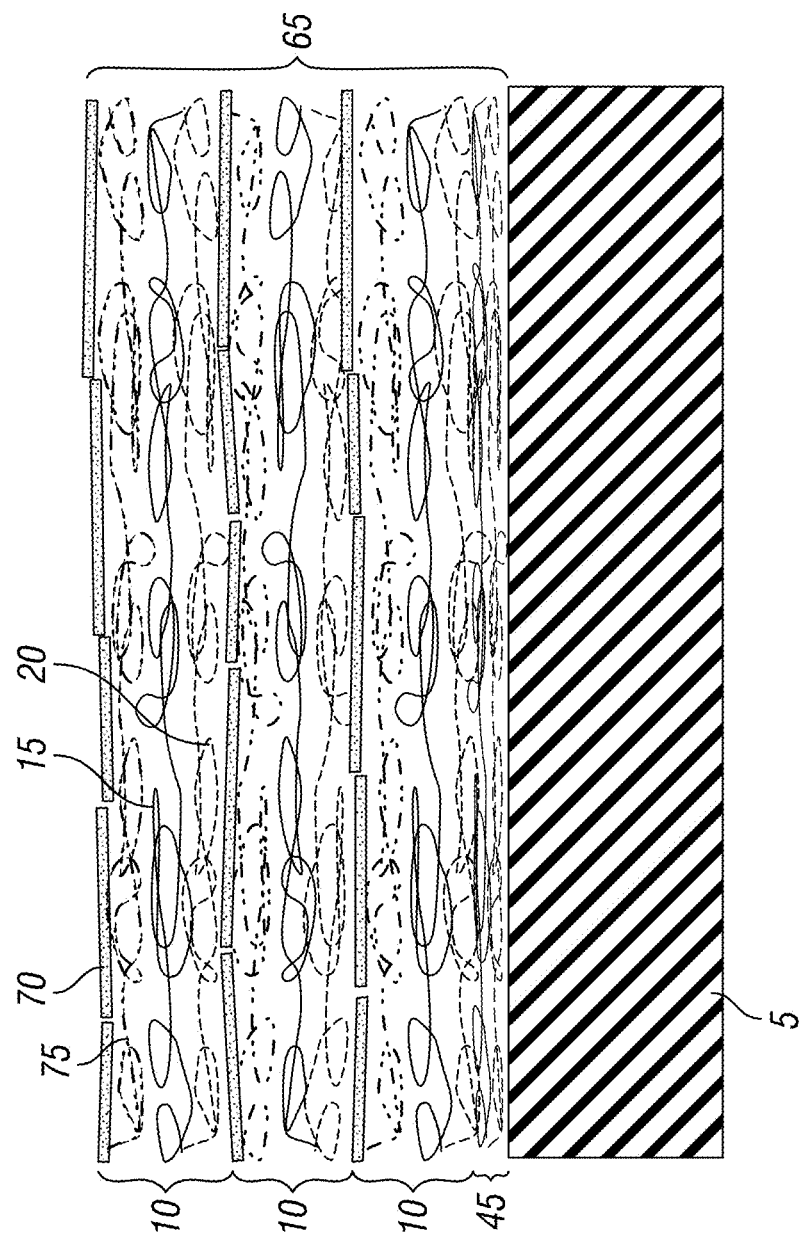
FIG. 3 illustrates an embodiment of three quadlayers and a rubber substrate.

In an embodiment, a multilayer thin film coating method provides a rubber substrate with a gas transmission retardant coating by alternately depositing positive and negative charged layers on the substrate. In embodiments, the multilayer thin film coating method provides two pairs of positive and negative layers, which two pairs comprise a quadlayer. Embodiments include the multilayer thin film coating method producing a plurality of quadlayers on a rubber substrate. Without limitation, a quadlayer may provide a desired yield. Further, without limitation, a plurality of quadlayers provides a desired retardant to gas and vapor transmission through the rubber substrate. The positive and negative layers may have any desired thickness. In embodiments, each layer is between about 0.5 nanometers and about 100 nanometers thick, alternatively between about 1 nanometer and about 100 nanometers thick, and alternatively between about 0.5 nanometers and about 10 nanometers thick. In some embodiments of the multilayer thin film coating method. one or more of the positive layers are neutral rather than positively charged.

Any desirable rubber substrate may be coated with the multilayer thin film coating method. Without limitation, examples of suitable rubbers include natural rubber and synthetic rubber. In an embodiment, natural rubber comprises polyisoprene. In embodiments, synthetic rubbers include polychloroprene, butadiene-styrene copolymers, acrylonitrilebutadiene copolymers, ethylenepropylene-diene rubbers, polysulfide rubber, nitrile rubber, silicone, polyurethane, butyl rubber, or any combinations thereof. In an embodiment, the synthetic rubber comprises butyl rubber. In some embodiments, the rubber comprises a carbon black filled natural rubber formulation vulcanized with sulfur.

The negative charged (anionic) layers comprise layerable materials. The layerable materials include anionic polymers, colloidal particles, or any combinations thereof. Without limitation, examples of suitable anionic polymers include polystyrene sulfonate, polymethacrylic acid, polyacrylic acid, poly(acrylic acid, sodium salt), polyanetholesulfonic acid sodium salt, poly(vinylsulfonic acid, sodium salt), or any combinations thereof. In addition, without limitation, colloidal particles include organic and/or inorganic materials. Further, without limitation, examples of colloidal particles include clays, colloidal silica, inorganic hydroxides, silicon based polymers, polyoligomeric silsesquioxane, carbon nanotubes, graphene, or any combinations thereof. Any type of clay suitable for use in an anionic solution may be used. Without limitation, examples of suitable clays include sodium montmorillonite, hectorite, saponite, Wyoming bentonite, halloysite, or any combinations thereof. In an embodiment, the clay is sodium montmorillonite. Any inorganic hydroxide that may provide retardancy to gas or vapor transmission may be used. In an embodiment, the inorganic hydroxide includes aluminum hydroxide, magnesium hydroxide, or any combinations thereof.

The positive charge (cationic) layers comprise cationic materials. In some embodiments, one or more cationic layers are neutral. The cationic materials comprise polymers, colloidal particles, nanoparticles, or any combinations thereof. The polymers include cationic polymers, polymers with hydrogen bonding, or any combinations thereof. Without limitation, examples of suitable cationic polymers include branched polyethylenimine, linear polyethylenimine, cationic polyacrylamide, cationic poly diallyldimethylammonium chloride, poly(allyl amine), poly(allyl amine) hydrochloride, poly(vinyl amine), poly(acrylamide-co-diallyldimethylammonium chloride), or any combinations thereof. Without limitation, examples of suitable polymers with hydrogen bonding include polyethylene oxide, polypropylene oxide, poly(vinyl methyl ether), polyvinyl alcohol, polyvinylpyrrolidone, polyallylamine, branched polyethylenimine, linear polyethylenimine, poly(acrylic acid), poly(methacrylic acid), copolymers thereof, or any combinations thereof. In embodiments, the polymers with hydrogen bonding are neutral polymers. In addition, without limitation, colloidal particles include organic and/or inorganic materials. Further, without limitation, examples of colloidal particles include clays, layered double hydroxides, inorganic hydroxides, silicon based polymers, polyoligomeric silsesquioxane, carbon nanotubes, graphene, or any combinations thereof. Without limitation, examples of suitable layered double hydroxides include hydrotalcite, magnesium LDH, aluminum LDH, or any combinations thereof.

In embodiments, the positive (or neutral) and negative layers are deposited on the rubber substrate by any suitable method. Embodiments include depositing the positive (or neutral) and negative layers on the rubber substrate by any suitable liquid deposition method. Without limitation, examples of suitable methods include bath coating, spray coating, slot coating, spin coating, curtain coating, gravure coating, reverse roll coating, knife over roll (i.e., gap) coating, metering (Meyer) rod coating, air knife coating, or any combinations thereof. Bath coating includes immersion or dip. In an embodiment, the positive (or neutral) and negative layers are deposited by bath. In other embodiments, the positive and negative layers are deposited by spray.

FIG. 1 illustrates an embodiment of rubber substrate 5 with coating 65 or quadlayer 10. In an embodiment to produce the coated rubber substrate 5 shown in FIG. 1, the multilayer thin film coating method includes exposing rubber substrate 5 to cationic molecules in a cationic mixture to produce first cationic layer 25 on rubber substrate 5. The cationic mixture contains first layer cationic materials 20. In an embodiment, first layer cationic materials 20 are positively charged or neutral. In embodiments, first layer cationic materials 20 are neutral. In some embodiments, first layer cationic materials 20 are polymers with hydrogen bonding having a neutral charge. Embodiments include first layer cationic materials 20 comprising polyethylene oxide. Without limitation, first layer cationic materials 20 comprising neutral materials (i.e., polyethylene oxide) may provide a desired yield. In such an embodiment, rubber substrate 5 is negatively charged or neutral. Embodiments include rubber substrate 5 having a negative charge. Without limitation, a negatively charged rubber substrate 5 provides a desired adhesion. The cationic mixture includes an aqueous solution of first layer cationic materials 20. The aqueous solution may be prepared by any suitable method. In embodiments, the aqueous solution includes first layer cationic materials 20 and water. In other embodiments, first layer cationic materials 20 may be dissolved in a mixed solvent, in which one of the solvents is water and the other solvent is miscible with water (e.g., water, methanol, and the like). The solution may also contain colloidal particles in combination with polymers or alone, if positively charged. Any suitable water may be used. In embodiments, the water is deionized water. In some embodiments, the aqueous solution may include from about 0.05 wt. % first layer cationic materials 20 to about 1.50 wt. % first layer cationic materials 20, alternatively from about 0.01 wt. % first layer cationic materials 20 to about 2.00 wt. % first layer cationic materials 20, and further alternatively from about 0.001 wt. % first layer cationic materials 20 to about 20.0 wt. % first layer cationic materials 20. In embodiments, rubber substrate 5 may be exposed to the cationic mixture for any suitable period of time to produce first cationic layer 25. In embodiments, rubber substrate 5 is exposed to the cationic mixture from about 1 second to about 20 minutes, alternatively from about 1 second to about 200 seconds, and alternatively from about 10 seconds to about 200 seconds, and further alternatively from about instantaneous to about 1,200 seconds. Without limitation, the exposure time of rubber substrate 5 to the cationic mixture and the concentration of first layer cationic materials 20 in the cationic mixture affect the thickness of first cationic layer 25. For instance, the higher the concentration of first layer cationic materials 20 and the longer the exposure time, the thicker the first cationic layer 25 produced by the multilayer thin film coating method.

In embodiments, after formation of first cationic layer 25, multilayer thin film coating method includes removing rubber substrate 5 with the produced first cationic layer 25 from the cationic mixture and then exposing rubber substrate 5 with first cationic layer 25 to anionic molecules in an anionic mixture to produce first anionic layer 30 on first cationic layer 25. The anionic mixture contains first layer layerable materials 15. Without limitation, the positive or neutral first cationic layer 25 attracts the anionic molecules to form the cationic(or neutral)-anionic pair of first cationic layer 25 and first anionic layer 30. The anionic mixture includes an aqueous solution of first layer layerable materials 15. In an embodiment, first layer layerable materials 15 comprise polyacrylic acid. The aqueous solution may be prepared by any suitable method. In embodiments, the aqueous solution includes first layer layerable materials 15 and water. First layer layerable materials 15 may also be dissolved in a mixed solvent, in which one of the solvents is water and the other solvent is miscible with water (e.g., ethanol, methanol, and the like). Combinations of anionic polymers and colloidal particles may be present in the aqueous solution. Any suitable water may be used. In embodiments, the water is deionized water. In some embodiments, the aqueous solution may include from about 0.05 wt. % first layer layerable materials 15 to about 1.50 wt. % first layer layerable materials 15, alternatively from about 0.01 wt. % first layer layerable materials 15 to about 2.00 wt. % first layer layerable materials 15, and further alternatively from about 0.001 wt. % first layer layerable materials 15 to about 20.0 wt. % first layer layerable materials 15. In embodiments, rubber substrate 5 with first cationic layer 25 may be exposed to the anionic mixture for any suitable period of time to produce first anionic layer 30. In embodiments, rubber substrate 5 with first cationic layer 25 is exposed to the anionic mixture from about 1 second to about 20 minutes, alternatively from about 1 second to about 200 seconds, and alternatively from about 10 seconds to about 200 seconds, and further alternatively from about instantaneous to about 1,200 seconds. Without limitation, the exposure time of rubber substrate 5 with first cationic layer 25 to the anionic mixture and the concentration of first layer layerable materials 15 in the anionic mixture affect the thickness of the first anionic layer 30. For instance, the higher the concentration of first layer layerable materials 15 and the longer the exposure time, the thicker the first anionic layer 30 produced by the multilayer thin film coating method.

In embodiments as further shown in FIG. 1, after formation of first anionic layer 30, the multilayer thin film coating method includes removing rubber substrate 5 with the produced first cationic layer 25 and first anionic layer 30 from the anionic mixture and then exposing rubber substrate 5 with first cationic layer 25 and first anionic layer 30 to cationic molecules in a cationic mixture to produce second cationic layer 35 on first anionic layer 30. The cationic mixture contains second layer cationic materials 75. In an embodiment, second layer cationic materials 75 are positively charged or neutral. In embodiments, second layer cationic materials 75 are positive. In some embodiments, second layer cationic materials 75 comprise polyethylenimine. The cationic mixture includes an aqueous solution of second layer cationic materials 75. The aqueous solution may be prepared by any suitable method. In embodiments, the aqueous solution includes second layer cationic materials 75 and water. In other embodiments, second layer cationic materials 75 may be dissolved in as mixed solvent, in which one of the solvents is water and the other solvent is miscible with water (e.g., water, methanol, and the like). The solution may also contain colloidal particles in combination with polymers or alone, if positively charged. Any suitable water may be used. In embodiments, the water is deionized water. In some embodiments, the aqueous solution may include from about 0.05 wt. % second layer cationic materials 75 to about 1.50 wt. % second layer cationic materials 75, alternatively from about 0.01 wt. % second layer cationic materials 75 to about 2.00 wt. % second layer cationic materials 75, and further alternatively from about 0.001 wt. % second layer cationic materials 75 to about 20.0 wt. % second layer cationic materials 75. In embodiments, rubber substrate 5 may be exposed to the cationic mixture for any suitable period of time to produce second cationic layer 35. In embodiments, rubber substrate 5 is exposed to the cationic mixture from about 1 second to about 20 minutes, alternatively from about 1 second to about 200 seconds, and alternatively from about 10 seconds to about 200 seconds, and further alternatively from about instantaneous to about 1,200 seconds.

In embodiments, after formation of the second cationic layer 35, multilayer thin film coating method includes removing rubber substrate 5 with the produced first cationic layer 25, first anionic layer 30, and second cationic layer 35 from the cationic mixture and than exposing rubber substrate 5 with first cationic layer 25, first anionic layer 30, and second cationic layer 35 to anionic molecules in an anionic mixture to produce second anionic layer 40 on second cationic layer 35. The anionic mixture contains second layer layerable materials 70. Without limitation, the positive or neutral second cationic layer 35 attracts the anionic molecules to form the cationic(or neutral)-anionic pair of second cationic layer 35 and second anionic layer 40. The anionic mixture includes an aqueous solution of second layer layerable materials 70. In an embodiment, second layer layerable materials 70 comprise clay. Embodiments include the clay comprising sodium montmorillonite. The aqueous solution may be prepared by any suitable method. In embodiments, the aqueous solution includes second layer layerable materials 70 and water. Second layer layerable materials 70 may also be dissolved in a mixed solvent, in which one of the solvents is water and the other solvent is miscible with water (e.g., ethanol, methanol, and the like). Combinations of anionic polymers and colloidal particles may be present in the aqueous solution. Any suitable water may be used. In embodiments, the water is deionized water. In some embodiments, the aqueous solution may include from about 0.05 wt. % second layer layerable materials 70 to about 1.50 wt. % second layer layerable materials 70, alternatively from about 0.01 wt. % second layer layerable materials 70 to about 2.00 wt. % second layer layerable materials 70, and further alternatively front about 0.001 wt. % second layer layerable materials 70 to about 20.0 wt. % second layer layerable materials 70. In embodiments, rubber substrate 5 with first cationic layer 25, first anionic layer 30, and second cationic layer 35 may be exposed to the anionic mixture for any suitable period of time to produce second anionic layer 40. In embodiments, rubber substrate 5 with first cationic layer 25, first anionic layer 30, and second cationic layer 35 is exposed to the anionic mixture from about 1 second to about 20 minutes, alternatively from about 1 second to about 200 seconds, and alternatively front about 10 seconds to about 200 seconds, and further alternatively from about instantaneous to about 1,200 seconds. Quadlayer 10 is therefore produced on rubber substrate 5. In embodiments as shown in FIG. 1 in which rubber substrate 5 has one quadlayer 10, coating 65 comprises quadlayer 10. In embodiments, quadlayer 10 comprises first cationic layer 25, first anionic layer 30, second cationic layer 35, and second anionic layer 40.

In an embodiment as shown in FIG. 2 coating 65 also comprises primer layer 45. Primer layer 45 is disposed between rubber substrate 5 and first cationic layer 25 of quadlayer 10. Primer layer 45 may have any number of layers. The layer of primer layer 45 proximate to rubber substrate 5 has a charge with an attraction to rubber substrate 5, and the layer of primer layer 45 proximate to first cationic layer 25 has a charge with an attraction to first cationic layer 25. In embodiments as shown in FIG. 2, primer layer 45 is a bilayer having a first primer layer 80 and a second primer layer 85. In such embodiments, first primer layer 80 is a cationic layer (or alternatively neutral) comprising first primer layer materials 60, and second primer layer 85 is an anionic layer comprising second primer layer materials 90. First primer layer materials 60 comprise cationic materials.

In an embodiment, first primer layer materials 60 comprise polyethylenimine. Second primer layer materials 90 comprise layerable materials. In an embodiment, second primer layer materials 90 comprise polyacrylic acid. In other embodiments (not shown), primer layer 45 has more than one bilayer.

In further embodiments as shown in FIG. 2, the multilayer thin film coating method includes exposing rubber substrate 5 to cationic molecules in a cationic mixture to produce first primer layer 80 on rubber substrate 5. The cationic mixture contains first primer layer materials 60. In an embodiment, first primer layer materials 60 are positively charged or neutral. In embodiments, the cationic mixture includes an aqueous solution of first primer layer materials 60. The aqueous solution may be prepared by any suitable method. In embodiments, the aqueous solution includes first primer layer materials 60 and water. In other embodiments, first primer layer materials 60 may be dissolved in a mixed solvent, in which one of the solvents is water and the other solvent is miscible with water (e.g., water, methanol, and the like). The solution may also contain colloidal particles in combination with polymers or alone, if positively charged. Any suitable water may be used. In embodiments, the water is deionized water. In some embodiments, the aqueous solution may include from about 0.05 wt. % first primer layer materials 60 to about 1.50 wt. % first primer layer materials 60, alternatively from about 0.01 wt. % first primer layer materials 60 to about 2.00 wt. % first primer layer materials 60, and further alternatively from about 0.001 wt. % first primer layer materials 60 to about 20.0 wt. % first primer layer materials 60. In embodiments, rubber substrate 5 may be exposed to the cationic mixture for any suitable period of time to produce first primer layer 80. In embodiments, rubber substrate 5 is exposed to the cationic mixture from about 1 second to about 20 minutes, alternatively from about 1 second to about 200 seconds, and alternatively from about 10 seconds to about 200 seconds, and further alternatively from about instantaneous to about 1,200 seconds.

In embodiments as shown in FIG. 2, after formation of first primer layer 80, multilayer thin film coating method includes removing rubber substrate with the produced first primer layer 80 from the cationic mixture and then exposing rubber substrate 5 with first primer layer 80 to anionic molecules in an anionic mixture to produce second primer layer 85 on first primer layer 80. The anionic mixture contains second primer layer materials 90. The anionic mixture includes an aqueous solution of second primer layer materials 90. The aqueous solution may be prepared by any suitable method. In embodiments, the aqueous solution includes second primer layer materials 90 and water. Second primer layer materials 90 may also be dissolved in a mixed solvent, in which one of the solvents is water and the other solvent is miscible with water (e.g., ethanol, methanol, and the like). Combinations of anionic polymers and colloidal particles may be present in the aqueous solution. Any suitable water may be used. In embodiments, the water is deionized water. In some embodiments, the aqueous solution may include from about 0.05 wt. % second primer layer materials 90 to about 1.50 wt. % second primer layer materials 90, alternatively from about 0.01 wt. % second primer layer materials 90 to about 2.00 wt. % second primer layer materials 90, and further alternatively from about 0.001 wt. % second primer layer materials 90 to about 20.0 wt. % second primer layer materials 90. In embodiments, the rubber substrate 5 with first primer layer 80 may be exposed to the anionic mixture for any suitable period of time to produce second primer layer 85. In embodiments, rubber substrate 5 with first primer layer 80 is exposed to the anionic mixture from about 1 second to about 20 minutes, alternatively from about 1 second to about 200 seconds, and alternatively from about 10 seconds to about 200 seconds, and further alternatively from about instantaneous to about 1,200 seconds. Rubber substrate 5 with primer layer 45 is then removed from the anionic mixture and then the multilayer thin film coating method proceeds to produce quadlayer 10.

In embodiments as shown in FIG. 3, the exposure steps are repeated with substrate 5 having quadlayer 10 continuously exposed to the cationic mixture and then the anionic mixture to produce a coating 65 having multiple quadlayers 10. The repeated exposure to the cationic mixture and then the anionic mixture may continue until the desired number of quadlayers 10 is produced. Coating 65 may have any sufficient number of quadlayers 10 to provide rubber substrate 5 with a desired retardant to gas or vapor transmission. In an embodiment, coating 65 has between about 1 quadlayer 10 and about 40 quadlayers 10, alternatively between about 1 quadlayer 10 and about 1,000 quadlayers 10.

In an embodiment, the multilayer thin film coating method provides a coated rubber substrate 5 (e.g., comprising coating 65) with a yield between about 0.1% and about 100% alternatively between about 1% and about 10%. In addition, embodiments include the multilayer thin film coating method providing a coated rubber substrate 5 having a gas transmission rate between about 0.03 cc/(m$^2$*day*atm) and about 100 cc/(m$^2$*day*atm), alternatively between about 0.3 cc/(m$^2$*day*atm) and about 100 cc/(m$^2$*day*atm), and alternatively between about 3 cc/(m$^2$*day*atm) and about 30 cc/(m$^2$*day*atm).

It is to be understood that the multilayer thin film coating method is not limited to exposure to a cationic mixture followed by an anionic mixture. In embodiments in which rubber substrate 5 is positively charged, the multilayer thin film coating method includes exposing rubber substrate 5 to the anionic mixture followed by exposure to the cationic mixture. In such embodiment (not illustrated), first anionic layer 30 is deposited on rubber substrate 5 with first cationic layer 25 deposited on first anionic layer 30, and second anionic layer 40 is deposited on first cationic layer 25 followed by second cationic layer 35 deposited on second anionic layer 40 to produce quadlayer 10 with the steps repeated until coating 65 has the desired thickness. In embodiments in which rubber substrate 5 has a neutral charge, the multilayer thin film coating method may include beginning with exposure to the cationic mixture followed by exposure to the anionic mixture or may include beginning with exposure to the anionic mixture followed by exposure to the cationic mixture.

In embodiments (not shown), one or more than one cationic layer (i.e., first cationic layer 25, second cationic layer 35, cationic layers in primer layer 45) may be comprised of more than one type of cationic materials. In an embodiment (not shown), one or more than one anionic layer (i.e., first anionic layer 30, second anionic layer 40, anionic layers in primer layer 45) may be comprised of more than one type of anionic material. In some embodiments, one or more cationic layers are comprised of the same materials, and/or one or more of the anionic layers are comprised of the same anionic materials. It is to be understood that coating 65 is not limited to one layerable material but may include more than one layerable material and/or more than one cationic material.

In some embodiments, the multilayer thin film coating method includes rinsing rubber substrate 5 between each (or alternatively more than one) exposure step (i.e., step of exposing to cationic mixture or step of exposing to anionic mixture). For instance, after rubber substrate 5 is removed from exposure to the cationic mixture, rubber substrate 5 with first cationic layer 25 is rinsed and then exposed to an anionic mixture. In some embodiments, quadlayer 10 is rinsed before exposure to the same or another cationic and/or anionic mixture. In an embodiment, coating 65 is rinsed. The rinsing is accomplished by any rinsing liquid suitable for removing all or a portion of ionic liquid from rubber substrate 5 and any layer. In embodiments, the rinsing liquid includes deionized water, methanol, or any combinations thereof. In an embodiment, the rinsing liquid is deionized water. A layer may be rinsed for any suitable period of time to remove all or a portion of the ionic liquid. In an embodiment, a layer is rinsed for a period of time from about 5 seconds to about 5 minutes. In some embodiments, a layer is rinsed after a portion of the exposure steps.

In embodiments, the multilayer thin film coating method includes drying rubber substrate 5 between each (or alternatively more than one) exposure step (i.e., step of exposing to cationic mixture or step of exposing to anionic mixture). For instance, after rubber substrate 5 is removed from exposure to the cationic mixture, rubber substrate 5 with first cationic layer 25 is dried and then exposed to an anionic mixture. In some embodiments, quadlayer 10 is dried before exposure to the same or another cationic and/or anionic mixture. In an embodiment, coating 65 is dried. The drying is accomplished by applying a drying gas to rubber substrate 5. The drying gas may include any gas suitable for removing all or a portion of liquid from rubber substrate 5. In embodiments, the drying gas includes air, nitrogen, or any combinations thereof. In an embodiment, the drying gas is air. In some embodiments, the air is filtered air. The drying may be accomplished for any suitable period of time to remove all or a portion of the liquid from as layer, quadlayer 10, and/or coating 65. In an embodiment, the drying is for a period of time from about 5 seconds to about 500 seconds. In an embodiment in which the multilayer thin film coating method includes rinsing alter an exposure step, the layer is dried after rinsing and before exposure to the next exposure step. In alternative embodiments, drying includes applying a heat source to the layer, quadlayer 10, and/or coating 65. For instance, in an embodiment, rubber substrate 5 is disposed in an oven for as time sufficient to remove all or a portion of the liquid from a layer. In some embodiments, drying is not performed until all layers have been deposited, as a final step before use.

In some embodiments (not illustrated), additives may be added to rubber substrate 5 in coating 65. In embodiments, the additives may be mixed in anionic mixtures with layerable materials. In other embodiments, the additives are disposed in anionic mixtures that do not include layerable materials. In some embodiments, coating 65 has a layer or layers of additives. In embodiments, the additives are anionic materials. The additives may be used for any desirable purpose. For instance, additives may be used for protection of rubber substrate 5 against ultraviolet light or for abrasion resistance. For ultraviolet light protection, any negatively charged material suitable for protection against ultraviolet light and for use in coating 65 may be used. In an embodiment, examples of suitable additives for ultraviolet protection include titanium dioxide, or any combinations thereof. In embodiments, the additive is titanium dioxide. For abrasion resistance, any additive suitable for abrasion resistance and for use in coating 65 may be used. In embodiments, examples of suitable additives for abrasion resistance include crosslinkers. Any crosslinker suitable for use with a rubber may be used. In an embodiment, crosslinkers comprise a di-aldehyde. Examples of crosslinkers include glutaraldehyde, bromoalkanes, or any combinations thereof. The crosslinkers may be used to crosslink the anionic layers and/or cationic layers (i.e., first cationic layer 25 and first anionic layer 30). In an embodiment, rubber substrate 5 with coating 65 is exposed to additives in an anionic mixture.

In some embodiments, the pH of the anionic and/or cationic solution is adjusted, Without being limited by theory, reducing the pH of the cationic solution reduces growth of coating 65. Further, without being limited by theory, the coating 65 growth may be reduced because the cationic solution may have a high charge density at lowered pH values, which may cause the polymer backbone to repel itself into a flattened state. In some embodiments, the pH is increased to increase the coating 65 growth and produce a thicker coating 65. Without being limited by theory, a lower charge density in the cationic mixture provides an increased coiled polymer. The pH may be adjusted by any suitable means such as by adding an acid or base. In an embodiment, the pH of an anionic solution is between about 0 and about 14, alternatively between about 1 and about 7. Embodiments include the pH of a cationic solution that is between about 0 and about 14, alternatively between about 3 and about 12.

The exposure steps in the anionic and cationic mixtures may occur at any suitable temperature. In an embodiment, the exposure steps occur at ambient temperatures. In some embodiments, coating 65 is optically transparent.

In an embodiment, rubber substrates 5 may comprise a portion or all of the rubber portions of a tire. In such an embodiment, coating 65 may provide a barrier that limits gas (i.e., oxygen), vapor, and/or chemicals to pass through the tire. Rubber substrates 5 with coating 65 may be used for any suitable portions of a tire such as, without limitation, the carcass, the innerliner, and the like. In an embodiment, the carcass of a tire comprises rubber substrate 5 with coating 65.

To further illustrate various illustrative embodiments of the present invention, the following examples are provided.

EXAMPLE 1

Materials. Natural sodium montmorillonite (MMT)(CLOISITE® NA+, which is a registered trademark of Southern Clay Products, Inc.) clay was used as received. Individual MMT platelets had a negative surface charge in deionized water, reported density of 2.86 g/cm$^3$, thickness of 1 nm, and a nominal aspect ratio (l/d)≥200. Branched polyethylenimine (PEI) ($M_w$=25,000 g/mol and $M_n$=10,000 g/mol), polyethylene oxide (PEO) ($M_w$=4,000,000 g/mol) and polyacrylic acid (PAA) (35 wt. % in water, $M_w$=100,000 g/mol) were purchased from Sigma-Aldrich (Milwaukee, Wis.) and used as received. 500 μm thick, single-side-polished, silicon wafers were purchased from University Wafer (South Boston, Mass.) and used as reflective, substrates for film growth characterization via ellipsometry.

Film Preparation. All Film deposition mixtures were prepared using 18.2MΩ deionized water, from a DIRECT-Q® 5 Ultrapure Water System, and rolled for one day (24 h) to achieve homogeneity. DIRECT-Q® is a registered trademark of Millipore Corporation. Prior to deposition, the pH of 0.1 wt. % aqueous solutions of PEI were altered to 10 or 3 using 1.0 M HCl, the pH of 0.1 wt. % aqueous solutions of PE0 were altered to 3 using 1.0 M HCl, the pH of 0.2 wt. % aqueous solutions of PAA were altered to 3 using 1.0 M HCl, and the pH of 2.0 wt. % aqueous suspensions of MMT were altered to 3 using 1.0 M HCl. Silicon wafers were piranha treated for 30 minutes prior to rinsing with water, acetone, water again and finally dried with filtered air prior to deposition. Rubber substrates were rinsed with deionized water, immersed in a 40 wt. % propanol in water bath at 40° C. for 5 minutes, rinsed with RT 40 wt. % propanol in water, rinsed with deionized water, dried with filtered air, and plasma cleaned for 5 minutes on each side. Each appropriately treated substrate was then dipped into the PEI solution at pH 10 for 5 minutes, rinsed with deionized water, and dried with filtered air. The same procedure was followed when the substrate was next dipped into the PAA solution. Once this initial bilayer was deposited, the above procedure was repeated when the substrate. was dipped into the PEO solution, then the PAA solution, then the PEI solution at pH 3, and finally the MMT suspension, using 5 second dip times for polymer solutions and using one minute dip times for the MMT suspension, until the desired number of quadlayers of PEO/PAA/PEI/MMT were achieved. All films were prepared using a home-built robotic dipping system.

Film Characterization. Film thickness was measured every one to five quadlayers (on silicon wafers) using an ALPHA-SE® ellipsometer. ALPHA-SE® is a registered trademark of J.A. Woollam Co., Inc. OTR testing was performed by Mocon, Inc. in accordance with ASTM D-3985, using an Oxtran 2/21 ML instrument at 0% RH.

Figure 4:
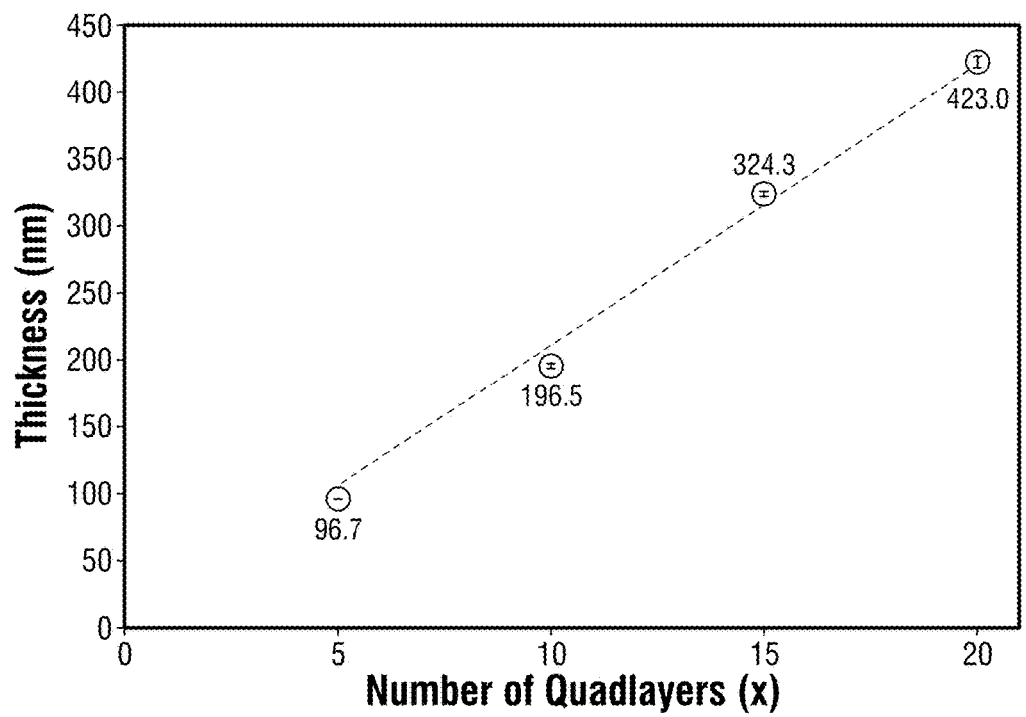
FIG. 4 illustrates thickness as a function of the number of quadlayers.
Figure 5:
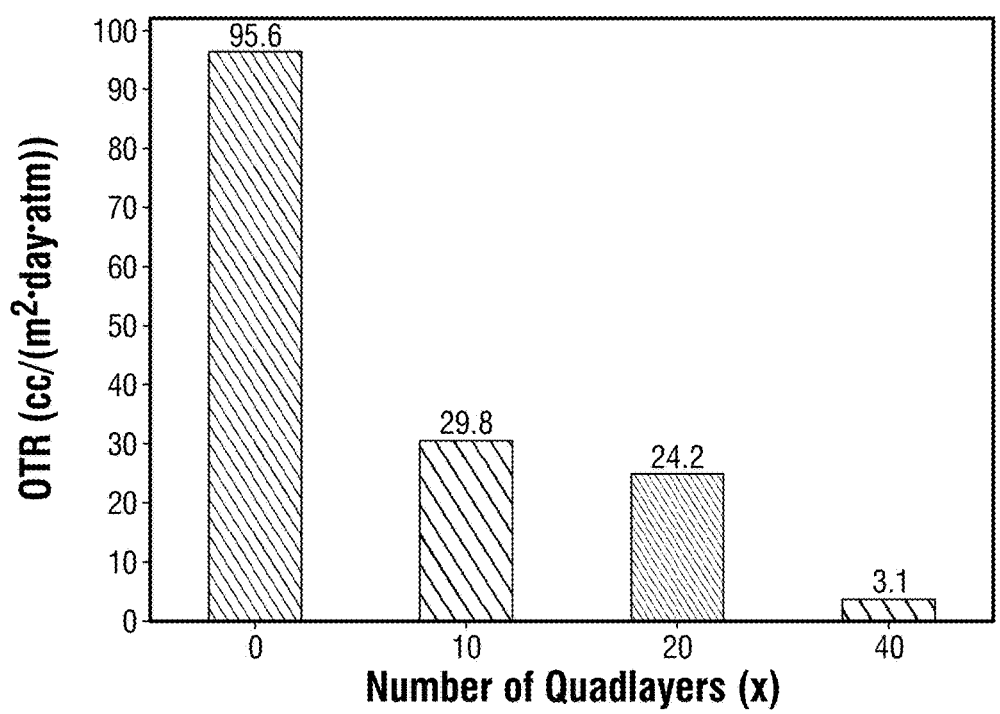
FIG. 5 illustrates oxygen transmission rate as a function of the number of quadlayers.
Figure 6:
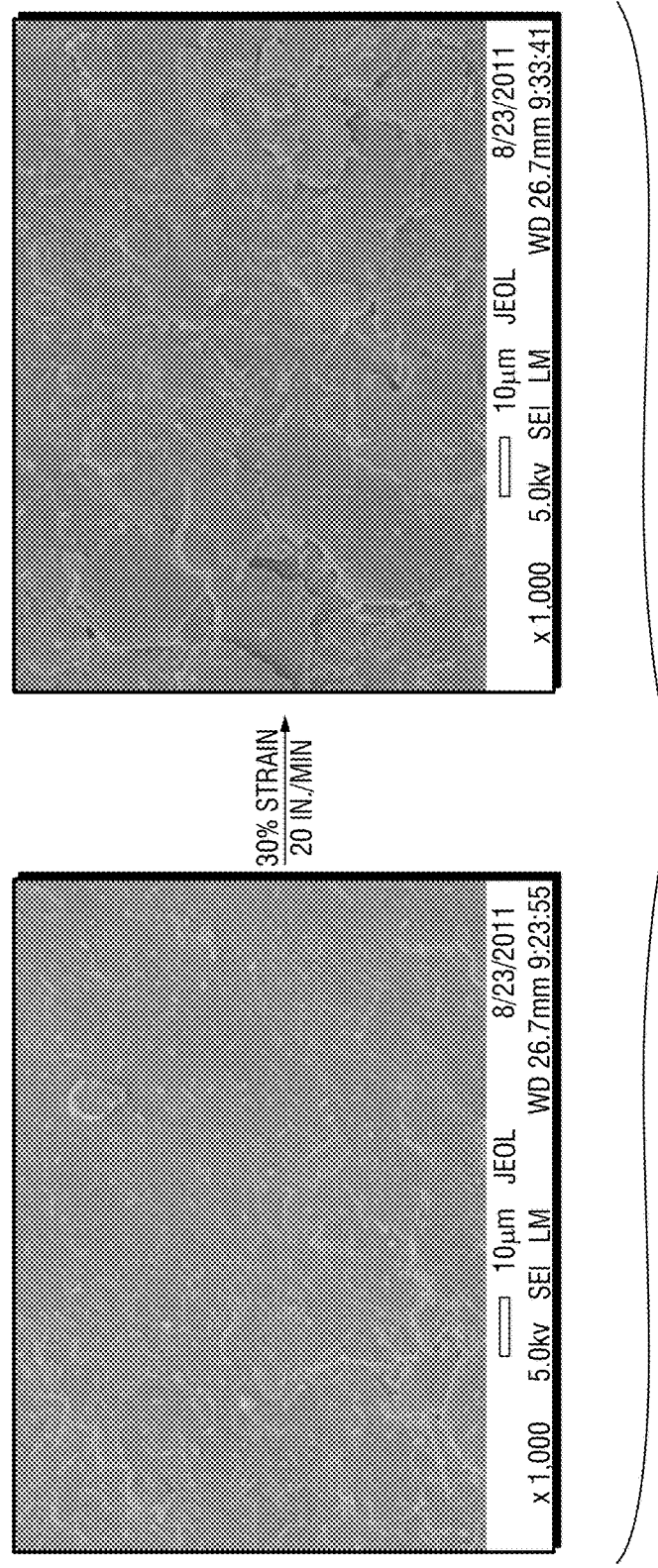
FIG. 6 illustrates images of elasticity of coating.

From the results, FIG. 4 illustrates thickness as a function of the number of quadlayers PEO/PAA/PEI/MMT when deposited on a silicon wafer and measured via ellipsometry. FIG. 5 illustrates results of oxygen transmission rate (OTR) as a function of the number of quadlayers of PEO/PAA/PEI/MMT when deposited on a 1 mm thick rubber plaque. FIG. 6 illustrates the elasticity of a coating of which the image on the left is 10 QLs on rubber, and the image on the right is the same coating stretched at 20 inches per minute to 30% strain. This right image showed no sign of mud-cracking and revealed the conformality of the coating to the stretched rubber surface.

Although the present invention and its advantages have been described in detail, it should be understood that various changes, substitutions and alterations may be made herein without departing from the spirit and scope of the invention as defined by the appended claims.

What is claimed is:

1. A method for coating a rubber substrate, comprising:
   (A) exposing the rubber substrate to a first cationic solution comprising polyethylene oxide to produce a first cationic layer on the rubber substrate;
   (B) exposing the first cationic layer to a first anionic solution to produce a first anionic layer on the first cationic layer;
   (C) exposing the first anionic layer to a second cationic solution comprising polyethylenimine to produce a second cationic layer on the first anionic layer; and
   (D) exposing the second cationic layer to a second anionic solution to produce a second anionic layer on the second cationic layer, wherein a quadlayer comprises the first cationic layer, the first anionic layer, the second cationic layer, and the second anionic layer, wherein the coating comprises the quadlayer, wherein the coating has a gas transmission rate between 0.03 cc/($m^2$*day*atm) and 100 cc/($m^2$*day*atm), wherein a pH of the first anionic solution and the second anionic solution is between about 1 to about 7, and wherein a pH of the first cationic solution and the second cationic solution is between about 3 to about 12, and wherein the pH of the first cationic solution is greater than the pH of the first anionic solution, the second cationic solution, and the second anionic solution.

2. The method of claim 1, wherein the first cationic solution and the second cationic solution comprise cationic materials.

3. The method of claim 2, wherein the cationic materials comprise a polymer, a colloidal particle, a nanoparticle, or any combinations thereof.

4. The method of claim 3, wherein the polymer comprises a cationic polymer, a polymer with hydrogen bonding, or any combinations thereof.

5. The method of claim 4, wherein the cationic polymer comprises branched polyethylenimine, linear polyethylenimine, cationic polyacrylamide, cationic polydiallyldimethylammonium chloride, poly(allyl amine), poly(allyl amine) hydrochloride, poly(vinyl amine), poly(acrylamide-co-diallyldimethyl ammonium chloride), or any combinations thereof.

6. The method of claim 1, wherein the first anionic solution and the second anionic solution comprise layerable materials.

7. The method of claim 6, wherein the layerable materials comprise an anionic polymer, a colloidal particle, or any combinations thereof.

8. The method of claim 7, wherein the anionic polymer comprises a polystyrene sulfonate, a polymethacrylic acid, a polyacrylic acid, a poly(acrylic acid, sodium salt), a polyanetholesulfonic acid sodium salt, poly(vinylsulfonic acid, sodium salt), or any combinations thereof.

9. The method of claim 7, wherein the colloidal particle comprises a clay, a colloidal silica, an inorganic hydroxide, a silicon based polymer, a polyoligomeric silsesquioxane, a carbon nanotube, a graphene, or any combinations thereof.

10. The method of claim 1, wherein the first cationic layer comprises polyethylene oxide, the first anionic layer comprises polyacrylic acid, the second cationic layer comprises polyethylenimine, and the second anionic layer comprises sodium montmorillonite.

11. The method of claim 1, wherein the rubber substrate further comprises a primer layer disposed between the rubber substrate and the first cationic layer.

12. The method of claim 11, wherein the primer layer comprises a bilayer, wherein the bilayer comprises a first primer layer comprising a cationic layer and a second primer layer comprising an anionic layer.

13. The method of claim 1, further comprising repeating steps (A), (B), (C), and (D) to produce a plurality of quadlayers, wherein the coating comprises the plurality of quadlayers.

14. The method of claim 1, wherein the rubber substrate comprises a portion of a tire.

15. A method for coating a rubber substrate, comprising:
   (A) exposing the rubber substrate to a first anionic solution to produce a first anionic layer on the rubber substrate;
   (B) exposing the first anionic layer to a first cationic solution comprising polyethylene oxide to produce a first cationic layer on the first anionic layer;
   (C) exposing the first cationic layer to a second anionic solution to produce a second anionic layer on the first cationic layer; and
   (D) exposing the second anionic layer to a second cationic solution comprising polyethylenimine to produce a second cationic layer on the second anionic layer, wherein a quadlayer comprises the first anionic layer, the first cationic layer, the second anionic layer, and the second cationic layer wherein the coating comprises the quadlayer; wherein the coating has a gas transmission rate between 0.03 cc/(m$^2$*day*atm) and 100 cc/(m$^2$*day*atm), wherein a pH of the first anionic solution and the second anionic solution is between about 1 to about 7, wherein the pH of the first cationic solution and the second cationic solution is between about 3 to about 12, and wherein the pH of the first cationic solution is greater than the pH of the first anionic solution, the second cationic solution, and the second anionic solution.

16. A method for coating a rubber substrate, comprising:
(A) exposing the rubber substrate to a first solution comprising polyethyleneimine to produce a first layer on the rubber substrate;
(B) exposing the first layer to a second solution comprising polyethylene oxide a second layer on the first layer;
(C) exposing the second layer to a third solution comprising polyacrylic acid to produce a third layer on the first second layer; and
(D) exposing the third layer to a fourth solution comprising sodium montmorillonite to produce a fourth layer on the third layer, wherein the first solution has a pH that is greater than a pH of the second solution, the third solution, and the fourth solution.

17. The method of claim 16 wherein the rubber substrate comprises a portion of a tire.

\* \* \* \* \*